United States Patent
Bruesselbach et al.

(10) Patent No.: US 7,283,751 B2
(45) Date of Patent: Oct. 16, 2007

(54) ADAPTIVE OPTICAL SYSTEM COMPENSATING FOR PHASE FLUCTUATIONS

(75) Inventors: Hans W. Bruesselbach, Monte Nido, CA (US); Monica Minden, Monte Nido, CA (US); Metin S. Mangir, Santa Monica, CA (US); Cris Jones, Malibu, CA (US); David M. Pepper, Malibu, CA (US)

(73) Assignee: HRL Laboratories, LLC, Malibu, CA (US)

( * ) Notice: Subject to any disclaimer, the term of this patent is extended or adjusted under 35 U.S.C. 154(b) by 637 days.

(21) Appl. No.: 10/759,509

(22) Filed: Jan. 15, 2004

(65) Prior Publication Data

US 2004/0161239 A1   Aug. 19, 2004

Related U.S. Application Data

(60) Provisional application No. 60/441,044, filed on Jan. 17, 2003.

(51) Int. Cl.
*H04B 10/00*   (2006.01)
(52) U.S. Cl. .................. 398/119; 398/120; 398/123
(58) Field of Classification Search ........ 398/118–120, 398/123
See application file for complete search history.

(56) References Cited

U.S. PATENT DOCUMENTS

| 5,475,520 A | 12/1995 | Wissinger ............. 359/172 |
| 6,400,871 B1 | 6/2002 | Minden ............... 385/39 |
| 2002/0153497 A1* | 10/2002 | Pepper et al. ......... 250/495.1 |
| 2003/0001073 A1* | 1/2003 | Presby et al. ......... 250/201.9 |
| 2004/0156638 A1* | 8/2004 | Graves et al. ......... 398/129 |

FOREIGN PATENT DOCUMENTS

| EP | 1 271 806 A1 | 1/2003 |
| WO | 02/084902 A2 | 10/2002 |

* cited by examiner

*Primary Examiner*—Dalzid Singh
(74) *Attorney, Agent, or Firm*—Ladas & Parry

(57) ABSTRACT

A method and apparatus for compensating for phase fluctuations incurred by an optical beam travelling through free space, especially a turbulent atmosphere. A transmitting station transmits a plurality of uniquely tagged optical beams through free space. The plurality of uniquely tagged optical beams are received at a receiving station, where a parameter of each uniquely tagged optical beam is quantified. Information associated with the quantified parameter for each uniquely tagged optical beam is then sent back to the transmitting station via a wireless feedback link. Using the information, the transmitting station adjusts at least one uniquely tagged optical beam to compensate for phase fluctuations.

21 Claims, 1 Drawing Sheet

ADAPTIVE OPTICAL SYSTEM COMPENSATING FOR PHASE FLUCTUATIONS

CROSS REFERENCE TO RELATED APPLICATIONS

This patent application is related to and claims the benefit of co-pending U.S. Provisional Patent Application Ser. No. 60/441,044, filed on Jan. 17, 2003 and titled "An Adaptive Optical System Compensating for Phase Fluctuations." The disclosure of U.S. Provisional Patent Application Ser. No. 60/441,044 is incorporated herein by reference in its entirety.

STATEMENT REGARDING FEDERALLY SPONSORED RESEARCH OR DEVELOPMENT

The invention described herein was made in the performance of work under a AFRL (Air Force Research Laboratory) THOR contract, and is subject to the provisions of Public Law F33615-02-C-1246 in which the Contractor has elected to retain title.

FIELD

The present invention relates to an adaptive optical system that compensates for phase fluctuations. More specifically, the present invention relates to an adaptive optical system that compensates for phase fluctuations using a wireless feedback link.

BACKGROUND

In this specification, the term "optical" is given the meaning typically used by those skilled in the art, that is, "optical" generally refers to that part of the electromagnetic spectrum which is generally known as the visible region together with those parts of the infrared and ultraviolet regions at each end of the visible region which are capable of being transmitted by dielectric optical waveguides such as optical fibers. Further, the term "optical signal" as used in this specification refers both to optical energy that is modulated with an information signal and to optical energy that is not modulated. Still further, "beam" or "optical beam" refers to optical energy that propagates through a free space environment, such as the atmosphere, and optical energy that propagates within dielectric optical waveguides such as optical fibers.

In the fields of optical communication and lasers, it is desirable to be able to compensate for dynamic phase fluctuations introduced into an optical beam by atmospheric turbulence. In general, without some form of adaptive optical processing to compensate for atmospheric or other signal-distorting effects, an optical channel will demand a much greater link power budget to achieve the necessary communication bandwidth at a prescribed bit-error rate.

Previous adaptive optical processing systems typically use one of the following servo-control architectures: (1) hard-wired servo-loops which obtain the necessary wavefront control information from a wavefront sensor (such as a Shack-Hartmann sensor) and then drive an array of multiple phase-control elements; or (2) an all optical approach (IAO (integrated adaptive optics), phase conjugation, real-time holography, etc.) which involves non-linear mixing or holographic processing of the optical wavefront in a material (e.g., multiple quantum well (MQW)) or a pixelated photoconductive surface (a spatial light modulator or electronic holographic camera, etc.).

Both of the aforementioned systems require a means by which to relay wavefront information from the target location back to the transmitter (which contains the optical source and the spatial light modulator). Wavefront information is also known as phase fluctuation information. In the hard-wired approach, phase fluctuation information is received and processed at an optical receiver. The processed information is then coupled back to the multi-pixel phased array via some type of communication cable. Such a technique is useful because phase fluctuations reduce the power received at a receiver. Therefore, by adjusting the phase, improved bit-error rates and optimized link budgets can be achieved. However, such a hard-wired system is impractical for long-haul scenarios (e.g., from one airborne platform to another).

In the all-optical approach, light is reflected from a dominant (glint) feature of a target. The reflected light is then received by a receiver that processes the wavefront information of the reflected light. Because the wavefront information is determined using reflected light, the path through which the light is traveling distorts the light twice, once upon traversal to the target, and once upon return from a dominant (glint) feature on the target. This reduces the overall signal to noise ratio and convergence time of the system. Also, this double pass architecture increases the probability of the system to form up (i.e., converge) on an undesirable feature (perhaps, a more dominate glint) which increases the probability of the interception and detection of the light.

As a result, there is a need for an adaptive optical system that uses a single-pass architecture to compensate for phase fluctuations of an optical beam. There is also a need for an adaptive optical system in which the information for phase fluctuation compensation can be transmitted over long distances.

SUMMARY

Embodiments of the present invention provide an adaptive optical system that compensates for phase fluctuations. In an embodiment of the present invention, a transmitting station transmits one or more optical beams through free space. A receiver receives the one or more optical beams and quantifies a parameter for at least one of the one or more optical beams. Information associated with the quantified parameter is then sent back to the transmitting station via a wireless feedback link where the information is used to adjust the two or more optical beams to compensate for phase fluctuations.

Embodiments of the present invention preferably use all guided wave optical components, such as all optical fiber components, in the transmitter to apply a unique frequency tag to each optical beam that is to be directed to the receiver. Components that require that optical beams be coupled out of optical fiber and then relaunched back into optical fiber are typically less robust and are more expensive, complicated, and lossy than all-fiber components. Hence, preferred embodiments of the present invention have a phase modulator that is all fiber.

Embodiments of the present invention differ from other adaptive optical systems by eliminating the need for a wavefront sensor per se. Further, the information needed to compensate for phase fluctuations is determined at the receiving stations which eliminates the double-pass adaptive optical systems previously discussed. Embodiments of the present invention provide that the information can be transmitted over sufficiently long distances to make it useful in an aircraft-to-aircraft or possibly even aircraft-to-satellite environment. Such embodiments should function over any distance for which two-way time of flight is not longer than the atmospheric fluctuation time, typically a hundred kilometers or more (speed of light times approximately one millisecond).

DETAILED DESCRIPTION

Figure 1:
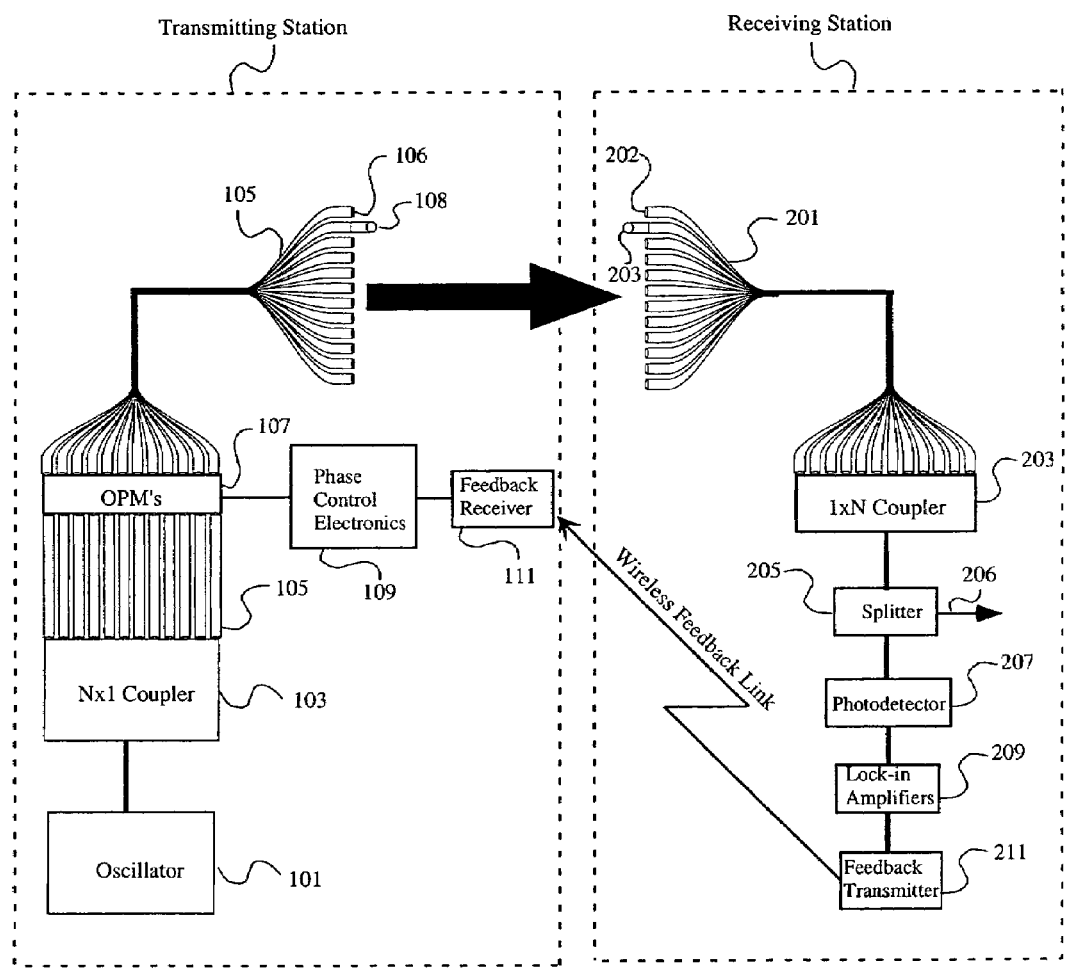
FIG. 1 illustrates a block diagram of the adaptive optical system according to a preferred embodiment.

Embodiments of the present invention will now be described more fully hereinafter with reference to the accompanying drawing, in which a preferred embodiment of the invention is shown. This invention may be embodied in many different forms and should not be construed as limited to the embodiments specifically set forth herein. Further, the dimensions of certain elements shown in the accompanying drawing may be exaggerated to more clearly show details. The present invention should not be construed as being limited to the dimensional relations shown in the drawing, nor should the individual elements shown in the drawing be construed to be limited to the dimensions shown.

Embodiments of the present invention provide a method and apparatus for transmitting high-bandwidth optical beams over an optical link and compensating for dynamic phase fluctuations introduced into the optical beams by atmospheric turbulence. In embodiments of the present invention, one or more optical beams are emitted into free space at a transmitting station and received by an optical receiver at a receiving station. At the receiver, a parameter of each optical beam is determined. This parameter is processed and information associated with the parameter is transmitted back to the transmitter via a wireless feedback link, where the phase of each one of the one or more optical beams may be adjusted.

FIG. 1 illustrates a preferred embodiment of the invention, which comprises a transmitting station and receiving station. The transmitting station comprises an oscillator 101, such as, for example, a 1.5 μm band telecommunications signal source, that may be modulated to provide an optical signal. The optical signal for the embodiment depicted in FIG. 1 may comprise a single wavelength, however, multiple wavelength optical signals may also be used, as will be discussed later. Industry standards define how the optical spectrum near 1.5 μm can be divided into specific channels. For example, the optical spectrum may be divided into many 2.5 GHz channels, which provide a substantial communication bandwidth with different information being carried in each of the channels. The optical signal and/or the channels of the optical signal may be modulated with information in the form of high-data rate serial information (e.g., 10 Gb modulated information) or in the form of 2-dimensional encoded image information. The optical signal may also be left unmodulated.

The optical signal is coupled to a N×1 coupler 103 via optical fiber, where it is distributed amongst an array 105 of optical fibers, to provide a plurality of optical beams. Each optical fiber in the array 105 is coupled with an optical phase modulator 107 as shown in FIG. 1. The number of fibers in the array is a design consideration, however there are preferably at least two fibers. The combination of the optical fiber array 105 and optical phase modulators 107 may be thought of functioning as a spatial phase modulator (SPM). In a reduction-to-practice apparatus similar to that depicted in FIG. 1, the optical phase modulators 107 are used not only to control the phase, but to also encode each optical beam in each optical fiber of the array 105 with a unique frequency "tag" to uniquely distinguish each optical beam in each optical fiber from the other optical beams in the other optical fibers. Encoding each optical beam with a unique frequency "tag" can be accomplished, for example, by amplitude modulating each optical beam with a unique carrier frequency in the range of several kilohertz. The optical phase modulators 107 preferably comprise pump diodes and are used to adjust the phase of each optical beam as will be discussed later, however other optical phase modulators known to those skilled in the art may also be used. Those skilled in the art will also realize that other SPMs such as arrays of optical piston elements (i.e., an array of optical MEMS piston-only actuators), arrays of electro-optical phase shifters (i.e., a liquid-crystal, phase-only SLM, arrays of conventional phase shifters, membrane light modulators), or an array of optical fibers, whose individual phases can be independently controlled via mechanical techniques (e.g., PZT's), or via thermal effects (via laser diode/fiber absorption in a fiber amplifier) may be used. The specific type of SPM used is dependent on several parameters that will be discussed later. In addition, the SPM depicted in FIG. 1 (combination of the optical fiber array and optical phase modulators) can be used in and of itself to amplify the optical beams. However, if different SPMs are used, additional amplifiers may be provided. After encoding and phase correction, the optical beam from each optical fiber is preferably directed through a collimating lens 108 provided at the output 106 of each optical fiber in the array 105. The output 106 of each optical fiber serves as an aperture or pixel through which the optical beams are emitted into free space, such as the atmosphere. In an alternative embodiment, if optical phase modulators are chosen such that they are more suited for free space beams, the optical phase modulators may be placed in front of the collimating lenses.

Using the optical fiber array 105 depicted in FIG. 1 is the preferable technique for emitting the optical beam into free space because the need for additional optical elements at the transmitter is greatly reduced. Conventional systems may require a complex optical train of expensive, bulky, and heavy gimbal-mounted optical components and telescopes. However, one design consideration of the array 105 involves a trade off between the fill factor of the optical fiber array 105 and the field-of-view of the system. If the field-of-view of the system is high, and the fill factor is low, then undesirable sidelobe features at the receiving station may result (in the far field). In this case, a diffractive or holographic optic microlens array (not shown) can be attached to the output 106 of the optical fiber array 105 to address this issue. A microlens array correction plate (which can be formed onto a single optical substrate) can establish a near 100% fill factor of the optical fiber array 105 with the system field of view as the tradeoff. Such microlens arrays are commercially available and do not represent a significant complication to the system. It has been demonstrated that a commercial off the shelf (COTS) hexagonal closed-packed fiber collimator array, not optimized for use in embodiments according to the present invention, results in a 0.3 Strehl ratio, and exhibits the expected six-fold symmetric far field pattern. This system Strehl ratio is suitable for many applications. Since these data were taken with commercial off the shelf (COTS) collimators designed to preserve Gaussian beam quality, it is anticipated that with minimal design and modification, using collimators specifically designed to maximize fill factor, the system Strehl ratio can be increased to meet a myriad of other system demands and constraints.

Upon propagating to the receiving station, the phase of the optical beams may be dynamically distorted by intervening optical-path phase aberrations (turbulence, boundary layer distortions, etc.). Because the propagation medium (i.e., the atmosphere) through which the optical beams travel is not necessarily uniform, the phase fluctuations of the optical beams may not be uniform. The optical beams are collected by an optical fiber array 201 at the receiving station. The optical fiber array 201 is similar to the optical fiber array 105 located at the transmitting station, and each optical fiber preferably comprises a collimating lens 203 coupled to its input 202. The plurality of optical beams is then combined into a single optical fiber with a 1×N coupler 203. The single optical fiber is preferably coupled to an optical splitter 205, which couples a small percentage (preferably about 1%) of the energy in the plurality of optical beams to a photodetector 207. The remaining energy can then be coupled, via output 206, into an optical communication network, or received by a very wide band communications detector, where the information in the plurality of optical beams can be processed. The plurality of optical beams received by the photodetector 207 are then converted into an electrical signal that is received by a plurality of lock-in amplifiers 209. The electrical signal comprises the frequencies corresponding to the frequencies "tagged" onto the plurality of optical beams using the optical phase modulators 107. In the embodiment shown in FIG. 1, both the transmitter and receiver apertures are corrected. In a reduction-to-practice apparatus similar to that shown in FIG. 1, only one collimator was used for the receiver, and this single collimator's output fiber was sent to the photodetector 207. This reduction-to-practice apparatus also used one lock-in amplifier for each optical fiber in the array 105. In another reduction-to-practice apparatus similar to that depicted in FIG. 1, receiver phasing was demonstrated using a single transmit collimator/sub-aperture and multiple receiver sub-apertures. In preferred embodiments according to the present invention, each lock-in amplifier is designed to look for a specific frequency which corresponds to one of the unique frequencies "tagged" onto the plurality of optical beams as previously discussed. When the lock-in amplifier finds this frequency, it quantifies the power associated with that frequency.

It is well known that optical beams that undergo phase fluctuations will lose far-field intensity. This is generally due to the non-planar wavefront of the optical beams, caused by phase fluctuations. When this beam is collected by the optical fibers in the array 201, the result is a power loss relative to what would be collected if the beam had not undergone phase fluctuations. However, when the power quantified by the lock-in amplifiers 209 for each frequency is maximized, the phase fluctuations incurred by each optical beam in the plurality of optical beams transmitted from the transmitting station to the receiving station will be minimized.

The feedback transmitter 211 receives the quantified power information from the plurality of lock-in amplifiers 209. The quantified power information is sent from the feedback transmitter 211 at the receiving station to the feedback receiver 111 at the transmitting station via the wireless feedback link. The phase control electronics 109 receive the quantified power information from the feedback receiver 111 and use the information to adjust the optical phase modulators 107. Because the information contains the quantified power associated for each unique frequency "tag", the phase control electronics can determine how to adjust each optical phase modulator 107 in order to maximize the power of each optical beam received at the optical fiber array 202, using, as an example, hill-climbing servo algorithms, which are well known in the art. Using optical phase modulators to adjust the phase of the optical beams is well known and is the subject matter of U.S. Pat. No. 6,400,871, the subject matter of which is herein incorporated by reference. Adjusting the phase of each optical beam will help compensate for phase fluctuations incurred by the optical beams during propagation from the transmitting station to receiving station. Furthermore, the phase adjustment of each optical beam may be different to account for dynamic phase fluctuations resulting from non-uniform propagation medium through which the optical beams propagate.

As aforementioned, the wireless feedback link consists of a feedback transmitter 211 located at the receiving station and a feedback receiver 111 at the transmitting station. The wireless feedback link is preferably a RF link, however, a low-bandwidth optical link may also be used. If a RF link is used, the feedback transmitter 211 may comprise a RF antenna that can have a high angular radiation pattern and field of view, since the data rate on the RF link is not large, typically on the order of 10 kb/s to 5 Mb/s depending on the required Strehl ratio, number of optical fibers in the array, and phase aberration bandwidth, which may range from less than 1 kHz to 10 kHz. As previously discussed, the information sent on the feedback link is processed by the phase control electronics 109 located at the transmitting station and used to adjust the optical phase modulators 107. In such an embodiment, the feedback transmitter 211 is modulated with the information regarding the quantified power. The information is then sent over the wireless feedback link and then demodulated at the feedback receiver 111 and used by the phase control electronics 109 to adjust the optical phase modulators 107. However, the phase control electronics 109 may also be located at the receiving station. In such an embodiment, the phase control electronics 109 may process the information and create a set of correction codes for adjusting the optical phase modulators 107. The correction codes are then modulated onto the wireless feedback link using the feedback transmitter 211 and sent to the feedback receiver 111 at the transmitting station where the correction codes are demodulated. The demodulated correction codes are used to adjust the optical phase modulators 107 and the optical beams until the power of the optical beams collected by the optical fiber array 201 is maximized.

Although the wireless feedback link has been described as asymmetric, those skilled in the art will realize that the wireless feedback link could be easily made symmetric. Furthermore, in addition to providing phase error information, the wireless feedback link could be used for low-bandwidth handshaking purposes to ensure low probability of interception (LPI)/low probability of detection (LPD), and low-bandwidth redundant communication information which, may be useful in the case of optical fadeouts, updating of error-correction codes, and secure key transmission, etc. In addition, although the transmitting station and receiving station have been described as having one-way transmission, those skilled in the art will realize that they could be easily implemented into a two-way transmission system.

Given that the bandwidth of the required feedback information is relatively low, commercial off the shelf (COTS)

RF devices and video system approaches may be employed for the wireless feedback link. For example, assuming a 10 kHz phase distortion bandwidth, 100 optical fibers in the array, and 5 bits of resolvable phase states for the feedback control, the required data rate would be on the order of 5 Mb/s. In addition, for this number of resolvable phase states, the required bit error rate (BER) to achieve bandwidth-limited correction (i.e., 5 bits per pixel) may only be on the order of $10^{-7}$, which is well within the state of the art. In addition, for this example, the bandwidth-limited Strehl ratio would be on the order of 0.999. This implies that the wireless feedback link of a real-world system would essentially pose no practical limits on the performance of the optical link carrying the optical beams. Furthermore, a conventional wide field of view (FOV) RF antenna may be employed for the RF transmitter and receiver with minimal need for pointing and tracking. Also, note that the Strehl limitation need not be so great (0.999). As an example, a wireless feedback link with 3 bits of resolvable phase states and a Strehl upper limit of 0.97, would require 3 MHz of bandwidth in the above example. This bandwidth would pose no major constraint on typical system performance metrics.

As previously discussed, a variety of different SPM's may be used. The SPM device that is used is subject to the overall bandwidth of the system. Using the example above with a 3 MHz bandwidth, each optical beam of the spatial phase modulator would typically be encoded with a sideband in the 3 MHz spectrum (equally spaced at 30 kHz, in the example of a 100 fiber array SPM). However, in the case of lower bandwidth SPM devices, a modulated oscillator emitting only a single wavelength would not be employed, since the modulation rate of the SPM elements (optical fibers) will limit the system in terms of the number of SPM elements for a given propagation distortion bandwidth and number of desired resolvable phase states. Examples of lower bandwidth SPMs include thermally and mechanically controlled optical fibers ($\approx$30 kHz bandwidth), membrane SLMs (50 kHz to 500 kHz bandwidth), piston-driven optical MEMS devices (1 kHz to 10's of MHz depending on size and phase excursion), and liquid crystal devices (<1 kHz to 10's of kHz). One embodiment for accommodating these classes of SPMs involves the use of wavelength division multiplexing (WDM). In such a technique, a multiple wavelength source is required. Each wavelength then services a subarray of the SPM, with the number of optical fibers in the subarray dictated by the bandwidth of the given SPM.

Examples of multiple wavelength sources include a laser with a multiplicity of wavelengths (e.g., a mode-locked laser with a channelizer), a laser with a grating output coupler which may oscillate at several wavelengths simultaneously, a single laser with a very high modulation drive (e.g., a quantum cascade laser with high-modulation index drive, or an injection-locked laser with a high-depth-of-modulation external modulator), or a number of independent free-running lasers. Channelizers in the form of narrowband filters ($\approx$GHz–100 GHz) are used to spatially disperse the various wavelength components emitted by the multiwavelength source. Examples of channelizers include fiber gratings, microsphere arrays, and planar waveguide grating couplers. Each of these wavelength components then addresses a subset of the SPM. At the receiving station an equivalent set of channelizers are used to partition the incoming optical beams into a set of optical detectors, with each detector used to demodulate and subsequently encode the information onto a common wireless link for the feedback control, as noted above. The use of a multiple wavelength source has the added effect of degradation of the effective optical coherence across the SPM array. Depending on the overall wavelength diversity, this can result in a corresponding degradation in the diffraction-limited performance of the system (e.g., a greater far-field spot size, additional sidelobe structures, etc., depending on the specific details of how the multi-wavelength sources are partitioned across the SPM aperture).

From the foregoing description, it will be apparent that the present invention has a number of advantages, some of which have been described herein, and others of which are inherent in the embodiments of the invention described or claimed herein. Also, it will be understood that modifications can be made to the apparatus and method described herein without departing from the teachings of subject matter described herein. As such, the invention is not to be limited to the described embodiments except as required by the appended claims.

The Invention claimed is:

1. An optical communication system comprising:
 a transmitting station transmitting one or more optical beams;
 a receiving station receiving at least one of the one or more optical beams and quantifying a parameter separately associated with each received optical beam; and
 a wireless feedback link sending information associated with the quantified parameter for each received optical beam to the transmitting station, and in response thereto, the transmitting station using the information to adjust at least one of the one or more optical beams based on the parameter separately associated therewith.

2. The system of claim 1, wherein the wireless feedback link further comprises a feedback receiver located at the transmitting station and a feedback transmitter located at the receiving station, the feedback transmitter transmitting the information to the feedback receiver.

3. The system of claim 2, wherein the one or more optical beams comprise one or more uniquely tagged optical beams.

4. The system of claim 3, wherein the parameter is the power of at least one of the one or more uniquely tagged optical beams.

5. The system of claim 1, wherein the wireless feedback link is a RF link or a low-bandwidth optical link.

6. An optical communication system comprising:
 a transmitting station transmitting one or more uniquely tagged optical beams;
 a receiving station receiving at least one of the one or more optical beams and quantifying a parameter for each of the one or more optical beams;
 a wireless feedback link including a feedback receiver located at the transmitting station and a feedback transmitter located at the receiving station, the feedback transmitter transmitting information associated with the quantified parameter for each one of the one or more optical beams to the feedback receiver, and in response thereto, the transmitting station using the information to adjust at least one of the one or more optical beams; and
 wherein the transmitting station further comprises:
 an oscillator emitting an optical signal;
 a N×1 splitter receiving the optical signal and splitting the optical signal into the one or more optical beams;
 a plurality of optical phase modulators, each optical phase modulator receiving one optical beam in the one or more optical beams and uniquely tagging the one optical beam, thereby providing the one or more uniquely tagged optical beams; and phase control electronics receiving the information from the feedback receiver, and processing the information to adjust the optical phase modulator which tagged the one uniquely tagged optical beam.

7. The system of claim 6, wherein the transmitting station further comprises an optical fiber array, each optical fiber in the array receiving at least one uniquely tagged optical beam from the plurality of optical phase modulators, and emitting the at least one uniquely tagged optical beam into an atmosphere or free space from an aperture.

8. The system of claim 7, wherein the N×1 splitter, the plurality of optical phase modulators, and the optical fiber array all comprise optical fiber components and optical fibers are used to couple the components.

9. The system of claim 6, wherein the plurality of optical phase modulators comprise pump diodes.

10. A method of compensating for phase fluctuations comprising:
applying a tag to one or more optical beams in a transmitting station;
transmitting the one or more uniquely tagged optical beams from the transmitting station;
receiving the one or more uniquely tagged optical beams at a receiving station;
quantifying a parameter associated with each one of the one or more uniquely tagged optical beams;
sending information associated with the quantified parameter for each one of the one or more uniquely tagged optical beams to the transmitting station over a wireless feedback link; and
adjusting a phase of at least one of the one or more uniquely tagged optical beams based on the information.

11. The method of claim 10, wherein adjusting at least one of the one or more uniquely tagged optical beams comprises adjusting the phase of the at least one uniquely tagged optical beam.

12. The method of claim 10, wherein applying a tag comprises amplitude modulating at least one of the one or more optical beams with a specified carrier frequency.

13. An adaptive optical system compensating for phase fluctuations comprising:
an optical fiber array located at a transmitting station, the optical fiber array emitting one or more uniquely tagged optical beams from an aperture;
a receiving station receiving the one or more uniquely tagged optical beams and quantifying a parameter for each uniquely tagged optical beam of the one or more uniquely tagged optical beams; and
a wireless feedback link sending information associated with the quantified parameter for each uniquely tagged optical beam to the transmitting station, and in response thereto, the transmitting station using the information to adjust at least one uniquely tagged optical beam to compensate for phase fluctuations.

14. The system of claim 13, wherein the wireless feedback link further comprises a feedback receiver located at the transmitting station and a feedback transmitter located at the receiving station, the feedback transmitter transmitting the information to the feedback receiver.

15. The system of claim 14, wherein the transmitting station further comprises:
an oscillator emitting an optical signal;
a N×1 splitter receiving the optical signal and splitting the optical signal into one or more optical beams;
one or more optical phase modulators providing the one or more uniquely tagged optical beams to the optical fiber array, wherein each optical phase modulator receives one optical beam of the one or more optical beams and uniquely tags the one optical beam; and
phase control electronics
receiving the information from the feedback receiver, and processing the information to adjust the optical phase modulator which tagged the at least one uniquely tagged optical beam.

16. The system of claim 15, wherein the optical phase modulators comprise pump diodes.

17. The system of claim 13, wherein the parameter is the power of the uniquely tagged optical beam.

18. The system of claim 13, wherein the wireless feedback link is a RF link or a low-bandwidth optical link.

19. An optical communication system comprising:
means for applying a tag to one or more optical beams in a transmitting station;
means for transmitting the one or more uniquely tagged optical beams from the transmitting station;
means for receiving the one or more uniquely tagged optical beams at a receiving station;
means for quantifying a parameter associated with each one of the one or more uniquely tagged optical beams;
means for sending information associated with the quantified parameter for each one of the one or more uniquely tagged optical beams to the transmitting station over a wireless feedback link; and
means for adjusting a phase of at least one of the one or more uniquely tagged optical beams based on the information.

20. The system of claim 19, wherein said means for applying a tag comprises means for amplitude modulating at least one of the one or more optical beams with a specified carrier frequency.

21. An optical communication system comprising:
a transmitting station simultaneously transmitting one or more unguided optical beams;
a receiving station receiving at least one of the one or more unguided optical beams and quantifying a parameter for each received unguided optical beam, said parameter or parameters providing independent phase information for each received optical beam; and
a wireless feedback link sending phase information associated with the parameter for each one of the received optical beam or beams to the transmitting station, and in response thereto, the transmitting station using said phase information to adjust independently phases of the one or more optical beams.

* * * * *